F. HENNEBÖHLE.
ENGINE STOP.
APPLICATION FILED SEPT. 4, 1909.
974,266.
Patented Nov. 1, 1910.
2 SHEETS—SHEET 2.
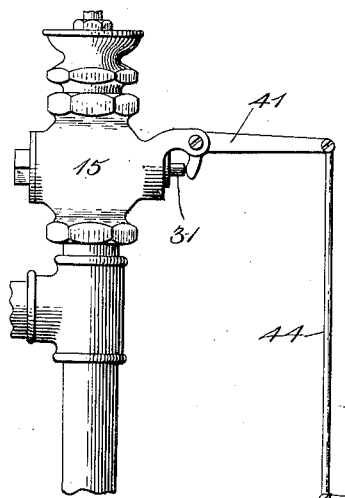
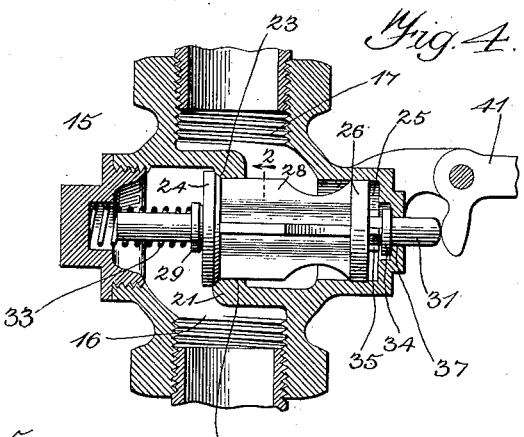
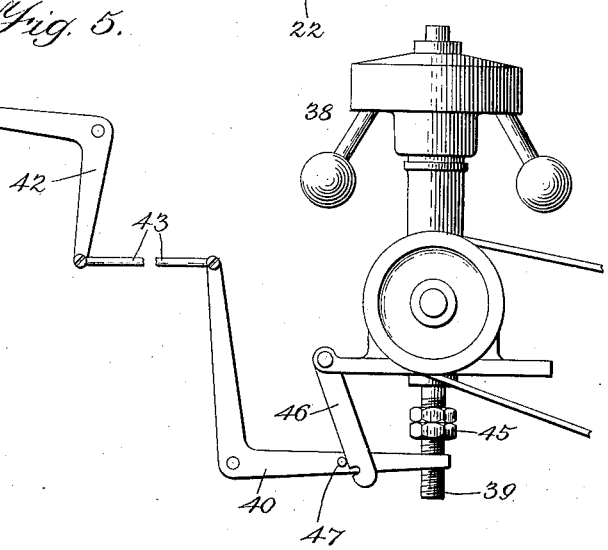
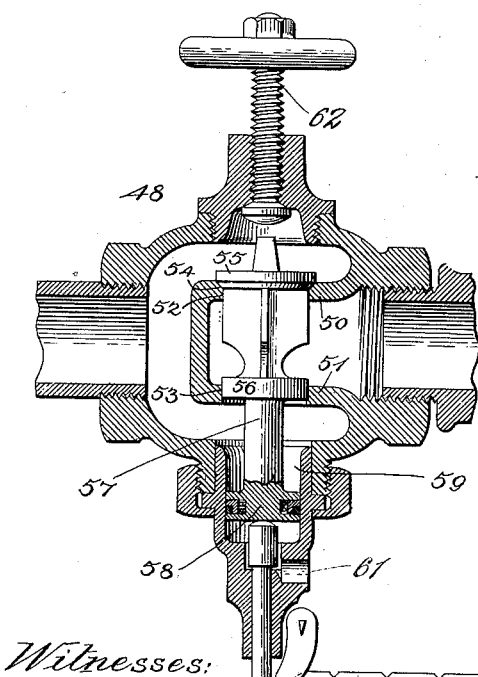
Witnesses:
J. C. Devick
George L. Chundahl
Inventor:
Frank Henneböhle
By Luther L. Miller
Attorney.

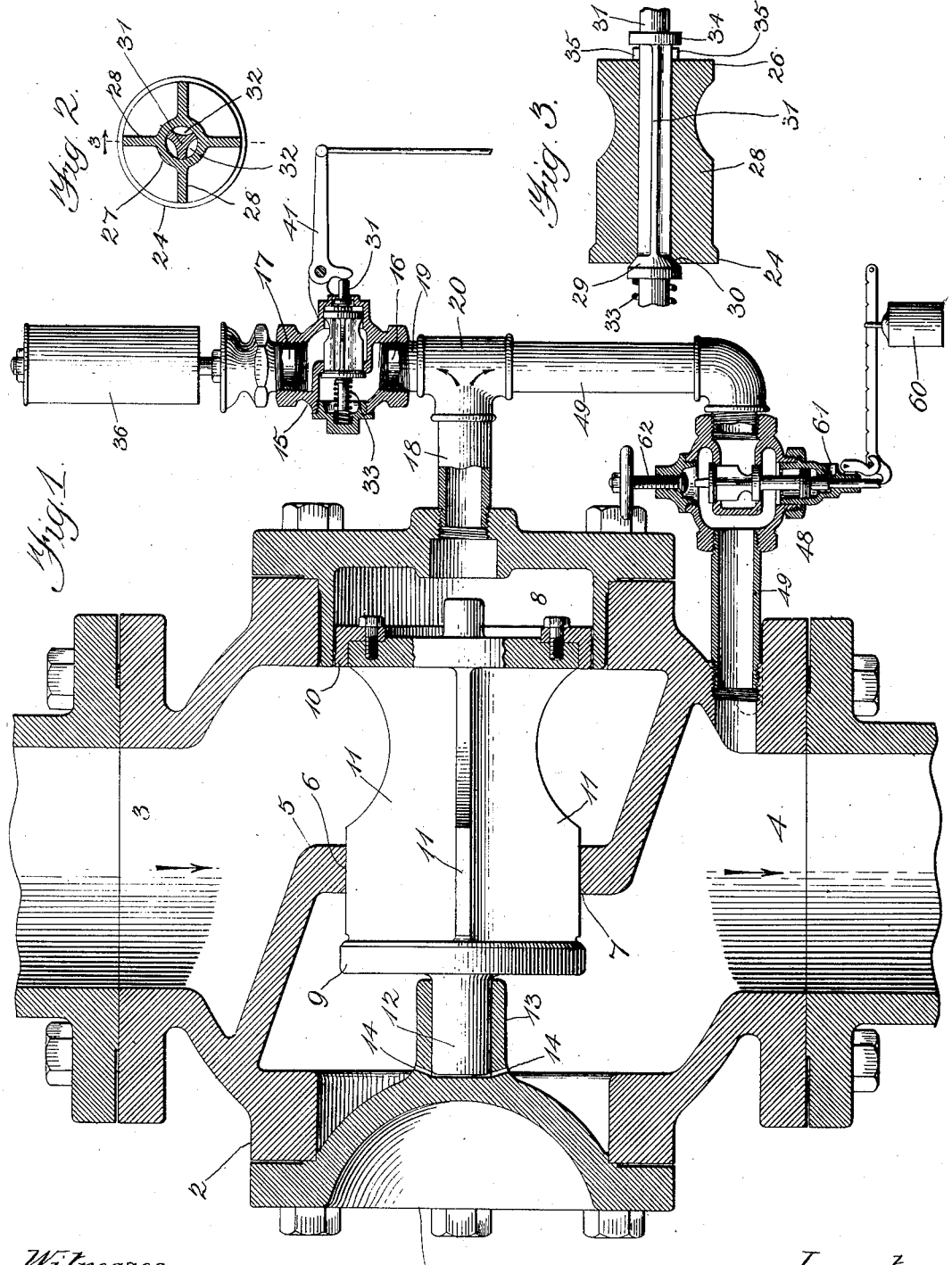

UNITED STATES PATENT OFFICE.

FRANK HENNEBÖHLE, OF CHICAGO, ILLINOIS.

ENGINE-STOP.

974,266.  Specification of Letters Patent.  Patented Nov. 1, 1910.

Application filed September 4, 1909. Serial No. 516,268.

*To all whom it may concern:*

Be it known that I, FRANK HENNEBÖHLE, a citizen of the United States, residing at Chicago, in the county of Cook and State of Illinois, have invented certain new and useful Improvements in Engine-Stops, of which the following is a specification.

The object of this invention is to provide means for shutting off the flow of motive fluid to a steam, internal-combustion or other engine in case the engine should race and in the event of a breakage in or adjacent to the engine which would reduce the pressure of the motive fluid below that desired to be supplied to the engine.

In the accompanying drawings, Figure 1 is a sectional view of the principal parts of an apparatus embodying the features of my invention. Fig. 2 is a section through a valve member, taken upon the plane of line 2 of Fig. 4. Fig. 3 is a section on line 3 of Fig. 2. Fig. 4 is a detail sectional view of a valve. Fig. 5 illustrates a means for operating said valve. Fig. 6 is a detail sectional view of another valve comprised in the apparatus.

The embodiment which I have selected for illustration comprises a valve 1 arranged to be placed in the steam supply pipe of a steam engine, preferably adjacent to the throttle valve, the latter being located between the valve 1 and the engine. The valve 1 comprises a casing 2 having an inlet 3, an outlet 4 and a partition 5 therein. In said partition is an opening 6 at one end of which is a valve seat 7. Alined with the opening 6, and in this instance of slightly larger diameter, is a chamber or cylinder 8. A valve member 9 arranged to close against the seat 7 and a piston 10 fitting within the cylinder 8 are rigidly secured together and guided by wings 11. The slidable valve structure is further guided by a guide stem 12 formed upon or attached to the disk 9 and slidably mounted in a tubular boss 13 upon one wall of the valve casing. The space within the boss 13 in the rear of the stem 12 preferably communicates with the interior of the valve casing through one or more openings 14.

The piston 10, while fitting snugly within the cylinder 8 so as to exclude dirt from the cylinder, does not prevent some leakage of the pressure fluid from the inlet side of the valve casing to the cylinder 8. (The space shown between the piston and the cylinder wall in Fig. 1 is considerably exaggerated for the sake of clearness.) Normally, therefore, the cylinder 8 is filled with steam at substantially the same pressure as the steam in the inlet side of the valve. It will be seen that the pressure of the steam normally will hold the valve disk 9 open, as shown in Fig. 1, and that if the pressure in the cylinder 8 be reduced, the unbalanced pressure upon the piston 10 will promptly seat the valve disk 9. The means for automatically reducing the pressure in the cylinder 8 in case the engine should exceed a predetermined maximum speed, will now be described.

A valve casing 15 having an inlet 16 and an outlet 17, is arranged with its inlet in communication at all times with the cylinder 8, as, for example, by means of pipes 18 and 19 and a fitting 20. It is desirable that the valve 15 shall be arranged close to the valve 1 in order that said valve 15 may act promptly. In the valve 15 is a partition 21 having an opening 22 therethrough and providing a seat 23 for a valve disk 24. Alined with the opening 22 is a chamber or cylinder 25 in which is a piston 26. The piston 26 and the valve disk 24 are rigidly connected together by means of a tubular stem 27 and guide wings 28 (Fig. 2). A pilot valve 29 is arranged to seat upon a valve seat 30 (Fig. 3) formed in the valve disk 24, and is provided with a stem 31 which is slidably mounted in the tubular stem 27. A passage for steam is provided in the tubular stem 27, as by forming grooves 32 in the stem 31. If desired, a light coiled spring 33 may be provided, said spring tending to hold the pilot valve 29 seated. A collar or projection 34 is fixed upon the pilot valve stem 31 within the rear end of the cylinder 25 and is arranged to engage projections 35 upon the inner side of the piston 26 for moving the valve structure 24, 26 and 28 to unseat the valve disk 24. The outlet side of the valve 15 communicates with a low-pressure region, as the atmosphere, and preferably through a whistle 36. The rear end of the pilot valve stem 31 projects through an opening 37 in the valve casing, a slight amount of leakage being permitted through said opening. It will be seen that the pressure in the cylinder 8, acting upon the valve disk 24 and the pilot valve 29, will hold said valves closed, and that if said valve disk 24 be unseated the pressure in the cylinder 8 will escape to the atmosphere, thus causing the valve disk 9 to be seated, and shutting off the flow of steam to the engine.

The means herein shown for automatically unseating the valve disk 24 comprises a device responsive to the speed of the engine, as, for example, a governor top 38. The movement of the balls is arranged to cause a movement of the stem 39. Should the engine race and the stem 39 thereby be caused to move beyond a predetermined position, said stem rocks a bell-crank lever 40 or other suitable mechanical device, connected, for instance, as shown in Fig. 5, with a bell-crank lever 41 pivotally mounted upon the valve 15. The connection herein illustrated by way of example consists of an intermediate bell-crank lever 42 and links 43 and 44. One arm of the bell-crank lever 41 presses against the end of the pilot valve stem 31. I have herein shown the lower end of the governor stem 39 as screw-threaded and as carrying a nut 45 arranged to press against and move one arm of the bell-crank lever 40.

When the engine causes the bell-crank lever 40 to be rocked, the pilot valve stem 31 is slid to unseat the pilot valve 29, thereby admitting steam to the space within the cylinder 25 behind the piston 26, thus balancing the pressures on the valve disk 24 and said piston. The continuing movement of the bell-crank lever 41 brings the collar 34 against the projections 35 and unseats the valve disk 24, whereupon the pressure in the cylinder 8 escapes to the atmosphere through the whistle 36, thereby sounding an alarm and shutting off the flow of steam to the engine.

If desired, means may be provided to lock the valve 24 open, as, for example, a latch 46 arranged to engage a pin 47 upon the bell-crank lever 40 when said bell-crank lever is operated by the governor stem 39. When the apparatus operates to shut off the steam from the engine, the engineer may manually disengage the latch 46 from the lever 40. The stoppage or decreasing speed of the engine permits the valve 24 to close, whereupon steam pressure gradually accumulates in the cylinder 8 so as to cause the valve disk 9 to be unseated.

The means for automatically reducing the pressure in the cylinder 8 in case of breakage resulting in the lowering of pressure in the outlet side of the valve 1, consists of a valve 48 included in piping 18 20 49 connecting the cylinder 8 with the outlet side of the valve 1. Within the casing of the valve 48 are walls 50 51 through which alined openings 52 53 of the same diameter are formed. One of said walls provides a valve seat 54 for a valve disk 55. Within the opening 53 is a valve disk 56. The disks 55 and 56 are rigidly connected together and are provided with a stem 57 upon which is a piston 58 fitting steam-tight within a cylinder 59. It will be seen that the pressure in the outlet side of the valve 1 is exerted upon the upper side of the valve disk 55, the upper side of the piston 58 and the lower side of the disk 56, and tends to hold the disk 55 seated.

Any suitable means may be provided for loading the valve 55 to counteract the pressure of the steam in the outlet side of the valve 1, as, for example, a weight 60 acting upon the under side of the piston 58. The space within the cylinder 59 below the piston 58 communicates with the atmosphere through an opening 61.

62 is a screw spindle which may be used, if desired, to seat the valve disk 55 after an operation.

The valve 48 is set to operate at a pressure slightly below the lowest pressure that the engine is intended to use; for instance, if the minimum steam pressure intended to be maintained is eighty pounds, the valve 48 may be set by means of the weight 60 to operate at, say, seventy-five pounds. Any cause, then, which reduces the pressure in the outlet side of the valve 1 to seventy-five pounds, or less, will permit the weight 60 automatically to unseat the valve disk 55, thereby establishing communication between the outlet side of the valve casing 1 and the cylinder 8, and equalizing the pressure in said outlet chamber and cylinder. The resulting reduction of pressure in the cylinder 8 causes the valve disk 9 to be seated, thereby shutting off the flow of steam through the valve 1.

When the valve 48 is closed after an operation, pressure gradually accumulates in the chamber 8 until the pressure in the inlet side of the valve 1 is able to open the disk 9. Since the piston 10 fits snugly in the cylinder 8, scale, sediment and other impurities are excluded from the cylinder and hence from the valve devices 15 and 48, thus obviating any liability of clogging or sticking of said valve devices.

I would have it understood that the invention is not limited to the details herein shown and described, for various modifications will occur to persons skilled in the art.

I claim as my invention:

1. A stop apparatus comprising a valve casing having an inlet and an outlet, a main valve member, a cylinder, a piston mounted in said cylinder and attached to said main valve member, said piston fitting said cylinder snugly to exclude dirt, but permitting leakage of pressure fluid from the inlet side of the valve casing to said cylinder, one face of said piston being exposed to the pressure in the inlet side of the casing and the other face of the piston being exposed to the pressure in said cylinder, said piston being of greater area than said main valve member, and a valve-controlled vent for said cylinder.

2. A stop apparatus comprising a valve casing having an inlet and an outlet, a main valve member, a cylinder, a piston mounted in said cylinder and attached to said main valve member, said piston fitting said cylinder snugly to exclude dirt, but permitting leakage of pressure fluid from the inlet side of the valve casing to said cylinder, one face of said piston being exposed to the pressure in the inlet side of the casing and the other face of the piston being exposed to the pressure in said cylinder, said piston being of greater area than said main valve member, a means of communication between the cylinder and the outlet side of the valve casing, and a valve in said means of communication, said valve being normally held seated by the pressure in the outlet side of the valve casing.

3. An engine stop comprising a main valve casing having an inlet and an outlet, a valve member in said casing arranged to control the flow of fluid through said casing, a chamber communicating with the inlet side of said valve casing, a movable member connected to said main valve member and exposed to the pressure in said chamber, a connection between said chamber and the outlet side of said casing, and means for controlling said communication.

4. An engine stop comprising a main valve casing having an inlet and an outlet, a valve member in said casing arranged to control the flow of fluid through said casing, a chamber communicating with the inlet side of said valve casing, a movable member connected to said main valve member and exposed to the pressure in said chamber, a means of communication between said chamber and the outlet side of said casing, and a valve located in said means of communication, said valve having a tendency to open, and being normally held closed by the pressure in the outlet side of the main valve casing.

FRANK HENNEBÖHLE.

Witnesses:
C. PAUL PARKER,
GEORGE L. CHINDAHL.